Patented May 5, 1925.

1,536,239

UNITED STATES PATENT OFFICE.

THOMAS H. REIGHARD, OF TARENTUM, PENNSYLVANIA, ASSIGNOR OF ONE-THIRD TO JOHN TASICK, OF TARENTUM, PENNSYLVANIA.

FLUXING MATERIAL.

No Drawing. Application filed September 21, 1921. Serial No. 502,122.

*To all whom it may concern:*

Be it known that I, THOMAS H. REIGHARD, a citizen of the United States, residing at Tarentum, in the county of Allegheny and State of Pennsylvania, have invented certain new and useful Improvements in Fluxing Materials, of which the following is a specification.

The invention relates to improvements in a hardening product, and method of producing the same. It is an object of the invention to provide a hardening product which is particularly adapted for the hardening of metals, such as iron and steel.

To produce my product I employ as one of the ingredients thereof a substance such as produced in my co-pending application Serial No. 468164. This substance or hardening agent results from the treatment of furnace slag, with agents such as oil of vitriol or sulphuric acid, which will be later described. To this agent or material I add definite proportions of copper, and aluminum, and then heat to a given temperature to cause a reaction between these materials and produce a product which I have found to be highly satisfactory as a hardening material for iron and steel.

To produce this product I take furnace slag and treat the same in the following manner.

I mix with one pound of oil of vitriol or sulphuric acid, approximately 25 pounds of furnace slag, whereupon this material is mixed with 10 pounds of boiling water. The material is thoroughly heated for a period of six hours, after which the water is drawn off and a product forming the present substance is produced. This product is generally of a light crumbling nature, and when analyzed is found to contain the following materials in approximately the following proportions:

|  | Per cent. |
|---|---|
| Silica ($SiO_2$) | 16.42 |
| Alumina ($Al_2O_3$) | 6.36 |
| Lime (CaO) | 22.00 |
| Magnesia (MgO) | 3.50 |
| Ferric oxide ($Fe_2O_3$) | .50 |
| Manganese oxide (MnO) | .42 |
| Sulphuric anhydride ($SO_3$) | 39.10 |
| Water ($H_2O$) | 11.54 |

To use about one hundred pounds of raw materials to produce the product I melt about 40 pounds of copper and when this copper is heated so that it is approximately cherry red, I add about 40 pounds of the fluxing material. To this material I then add aluminum in the proportion of about 20 pounds, and continue the heating so that the aluminum serves to burn and the other materials to react forming a hardening agent, which when mixed with steel or iron acts like tungsten or other expensive substances. The materials seem to go into a new physical and chemical combination, and produce a hardening material, which to my knowledge is far more satisfactory than agents heretofore employed in the hardening of steel.

Having thus described the invention what I claim is:

1. A process of producing a hardening product which consists in melting copper, in adding thereto a hardening product produced from furnace slag, in mixing with the said materials a quantity of aluminum, and in burning the aluminum in the mixed mass.

2. A product adapted for the hardening of metals containing copper, alumina, lime and sulphuric anhydride.

3. A product adapted for the hardening of metals comprising silica, alumina, lime, magnesia, ferric oxide, manganese oxide, sulphuric anhydride and water.

4. The process of producing a hardening product, which comprises melting copper, in adding thereto a substance containing silica, lime and sulphuric anhydride, and in then mixing with said materials a quantity of aluminum, and in heating the mixed materials until the aluminum burns therein forming a hardening product.

5. The process of producing a hardening product which comprises melting copper, in adding thereto when cherry red a substance containing silica, lime, magnesia and sulphuric anhydride, in then mixing with the materials aluminum, and then heating the mixed substances until the aluminum burns forming a hardening material.

In testimony whereof I affix my signature.

THOMAS H. REIGHARD.